(12) United States Patent
Hiyama et al.

(10) Patent No.: US 6,222,598 B1
(45) Date of Patent: Apr. 24, 2001

(54) LIQUID CRYSTAL DISPLAY

(75) Inventors: Ikuo Hiyama; Katsuyuki Funahata, both of Hitachi; Katsumi Kondo, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/349,154

(22) Filed: Jul. 8, 1999

Related U.S. Application Data

(62) Division of application No. 08/752,795, filed on Nov. 20, 1996, now Pat. No. 6,104,454.

(30) Foreign Application Priority Data

Nov. 22, 1995 (JP) .................................... 7-304518
Jan. 9, 1996 (JP) .................................... 8-001187

(51) Int. Cl.[7] .............................. G02F 1/1335; F21V 9/14
(52) U.S. Cl. .............................. 349/65; 349/64; 349/96; 349/57
(58) Field of Search .................................. 349/65, 70, 67, 349/57, 96, 61, 62, 64, 113, 117; 385/901, 129, 130, 131, 146; 362/19, 26, 31, 224, 331, 332; 359/487, 15, 488, 494, 495, 599

(56) References Cited

U.S. PATENT DOCUMENTS

| 4,798,448 | 1/1989 | Van Rattle ............................ 349/62 |
| 5,050,946 | * 9/1991 | Hathaway et al. .................... 349/65 |
| 5,157,526 | 10/1992 | Kondo et al. ........................ 349/62 |
| 5,161,873 | 11/1992 | Obata et al. ......................... 362/31 |
| 5,390,276 | 2/1995 | Tai et al. ............................. 385/901 |
| 5,528,720 | 6/1996 | Winston et al. ...................... 385/146 |
| 5,546,481 | 8/1996 | Meltz et al. ......................... 385/11 |
| 5,587,816 | 12/1996 | Gunjima et al. ..................... 349/62 |
| 5,712,694 | 1/1998 | Taura et al. ......................... 349/62 |
| 5,764,322 | * 6/1998 | Mamiya et al. ..................... 349/65 |
| 5,808,709 | 9/1998 | Davis et al. ......................... 349/65 |
| 5,861,990 | * 1/1999 | Tedes ................................. 359/599 |
| 6,025,897 | * 2/2000 | Weber et al. ........................ 349/96 |

FOREIGN PATENT DOCUMENTS

| 61-186817 | 8/1986 | (JP) . |
| 61-217085 | 9/1986 | (JP) . |
| 3042618 | 2/1991 | (JP) . |
| 6-202107 | 7/1994 | (JP) . |
| 6-265892 | 9/1994 | (JP) . |

OTHER PUBLICATIONS

"A Novel Polymer Film that Controls Light Transmission", Honda et al, Progress on Pacific Polymer Science, pp. 159–169, 1994, No Date.

* cited by examiner

Primary Examiner—Kenneth Parker
Assistant Examiner—Tai V. Duong
(74) Attorney, Agent, or Firm—Antonelli, Terry, Stout & Kraus, LLP

(57) ABSTRACT

A backlight device having a light source, a waveguide provided close to the light source, this waveguide being a wedge-shaped waveguide so constructed that the incident light from the light source can be greatly changed in its direction and made to exit therefrom, a polarizing beam splitter provided on the light-exiting side of the wedge-shaped waveguide, and a light converter disposed on the light-exiting side of the polarizing beam splitter. This backlight device is used for liquid crystal displays.

20 Claims, 9 Drawing Sheets

LIQUID CRYSTAL DISPLAY

CROSS REFERENCE TO RELATED APPLICATION

This is a divisional of U.S. application Ser. No. 08/752,795, filed Nov. 20, 1996, now U.S. Pat. No. 6,104,454, the subject matter of which is incorporated by reference herein.

BACKGROUND OF THE INVENTION

The present invention relates to liquid crystal displays, and particularly to a backlight device for liquid crystal displays.

The technology of liquid crystal display, particularly color liquid crystal display, has been remarkably progressed in recent years. There are now many different liquid crystal displays of which the display quality is as excellent as CRT. In addition, notebook-type personal computers have been widely used which have always backlight devices incorporated as illuminators. The backlight device is indispensable to the direct viewing type color liquid crystal display.

The color liquid crystal displays can be roughly classified into two types: the TN (twisted nematic) liquid crystal display of active matrix drive using TFT (thin film transistor) and the STN (super-twisted nematic) liquid crystal display of multiplex drive. Either one of these types has a liquid crystal layer held by glass substrates, and polarizing plates that are disposed on both sides of crystal layer to modulate the polarized state of linearly polarized incident light. The backlight devices for these liquid crystal displays have various luminance levels depending on the use. Particularly in the color notebook type personal computers, small thickness, light weight and low power consumption are absolutely necessary as well as the required brightness.

In the conventional liquid crystal displays, since the light emitted from the backlight device that is disposed on the back of the liquid crystal display is non-polarized light, more than half of the incident light to the display is absorbed by the polarizing plate provided on the incident side of either one of TN and STN type displays, that is, the light utilization efficiency is low and thus displaying is dark. Therefore, for bright displaying, the power consumption must be increased.

To solve these problems, there is proposed a backlight device which emits polarized light as disclosed in, for example, Japanese Patent Application JP-A-6-265892. This backlight device has polarizing means provided on the light emitting side of a plane type waveguide for the emitted light to be substantially perpendicular to the surface of the plane type waveguide, and a polarizing beam splitter provided on the polarizing means. The polarizing beam splitter has polarizing beam splitting layers laminated on a column-shaped prism array with a triangular cross-section.

In order to achieve a high-performance, polarized light source capable of highly polarizing, it is necessary to make highly parallel light incident to the polarizing beam splitting layers. This requirement is satisfied by a proposed backlight device which has a thin waveguide pipe provided nearby and has a microprism structure as disclosed in Japanese Patent Application JPA-6-202107.

However, it is very difficult to simultaneously achieve a highly-parallel light source and a high degree of light uniformity in a plane. Any light uniformity in a plane is not described in this gazette. In addition, the polarizing beam splitter (or retroreflective polarizing sheet) using a dielectric multilayer needs lamination of multiple layers for high degree of polarization, and the multilayer-thickness control is severe, thus leading to high cost.

SUMMARY OF THE INVENTION

It is an object of the invention to provide a backlight device having high brightness and high uniformity.

According to the invention, there is provided a backlight device including a light source, a waveguide provided close to the light source and of which the thickness is decreased with the increase of the distance from the light source, polarizing beam splitting means provided on the light-exiting side of the waveguide, and light converting means disposed on the polarizing beam splitting means so as to convert the path of light from the polarizing beam splitting means and thereby to make it exit in the direction substantially normal to the light-exiting surface of the waveguide.

Also, there is provided a liquid crystal display having a liquid crystal display element and the same backlight device as given above which is disposed on the back of the liquid crystal display element so that the average polarization axis of the light exiting from the backlight device is made substantially coincident with that of the polarizing plate of the liquid crystal display element on the incidence side.

According to another aspect of the invention,. there is provided a liquid crystal display having a liquid crystal display element, and a backlight device including a light source, a waveguide provided close to the light source, and light converting means provided at the light source and the waveguide so that the light from the light source can be made substantially parallel, the waveguide for guiding the light from the light converting means including polarizing means for making substantially linearly polarized light exit in the direction substantially perpendicular to the guiding direction, the backlight device being disposed on the back of the liquid crystal display element so that the average polarization axis of the light exiting from the backlight device is made substantially coincident with that of the polarizing plate of the liquid crystal display element on the light-incident side.

The light converting means is the means that is disposed between the lamp as the light source and the waveguide so as to make the diffused light from the light source highly parallel. This light converting means is preferably constructed so that a mirror (particularly a paraboloidal mirror) is provided around the light source and that the thickness is increased with the increase of the distance from the lamp, whereby the light is reduced in its diffusion and made parallel by utilizing total reflection.

The polarizing means is preferably constructed so as to be formed by laminating transparent media of which the index is different from that of the waveguide itself in a tilted manner relative to the light-incident direction. Particularly, polarization eliminators should be laminated after the transparent media, respectively.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Figure 1:
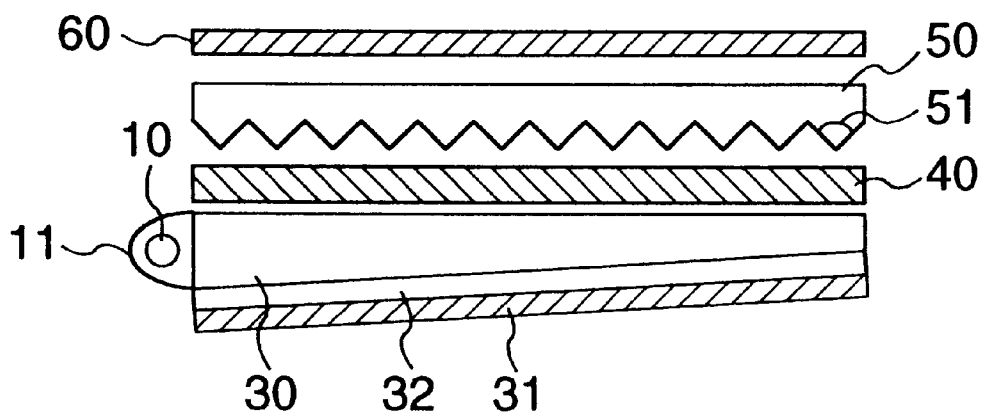
FIG. 1 is a schematic cross-sectional diagram of one embodiment of a backlight device of the invention.

The waveguide with its thickness tapered as its distance from a light source increases is called wedge-shaped waveguide. The light emitted from this wedge-shaped waveguide is sharply directed in the direction of about 70 degrees to the normal to the light-emitting surface of the waveguide. The emitted light from the waveguide is also so highly parallel that the half-amplitude level (the angular range in which the light intensity is ½ the maximum value) is ±10 degrees or below.

Although the polarizing beam splitting means formed of a dielectric multilayer needs a light source capable of generating highly parallel light as described above, the light emitted from this wedge-shaped waveguide is considerably parallel enough for use with the polarizing beam splitting means.

If the dot area of the white ink dots formed on the rear side of the waveguide is increased with the increase of the distance from the lamp, the light intensity in a plane can be maintained uniform.

In addition, the polarizing beam splitting means is formed to allow only the P polarized light of the non-polarized light emitted from the waveguide to pass and the S polarized light thereof to reflect. Here, the S polarized light is perpendicular to the incident plane (the plane including incident light and the normal to the incident light at the boundary plane), and the P polarized light is parallel to the incident plane.

The polarizing beam splitting means is a dielectric multilayer that is a lamination of multiple dielectric films having different refractive indexes. Since light is incident to the incident plane of the polarizing beam splitting means at about 70 degrees, flat dielectric films can be laminated with ease and deposited by spattering, vacuum evaporation, dipping or the like so that the film thickness can be controlled with high accuracy.

It is generally known that, in the interface between transparent media of refractive indexes $N_0$ and $N_1$, when light from the $N_0$ medium is incident to the $N_1$ medium at an incident angle of $\theta$ where the tangent of incident angle $\theta$ is equal to $N_1/N_0$ ($\tan \theta = N_1/N_0$), only the S polarized light is reflected with no reflection component of P polarized light and with the remaining S polarized light and P polarized light beging transmitted therethrough. Here, the incident angle $\theta$ is called Brewster angle. Thus, the polarizing beam splitting means can be designed by considering this Brewster angle, and produced by laminating media of different refractive indexes and controlling the thickness of the lamination to a wavelength order so that the phase of each polarized light can be controlled with only P polarized light transmitted and with the S polarized light reflected.

Preferably, a polarization eliminator is provided on the wedge-shaped waveguide. If a retardation film is provided as a polarization eliminator on the rear side of the wedge-shaped waveguide, the S polarized light reflected from the polarizing beam splitting means is changed to an elliptical polarized light (including linearly polarized light and circularly polarized light) by the retardation film, and again the changed S polarized light is incident back to the polarizing beam splitting means where only the P polarized light component is transmitted and the S polarized light component is reflected back to the waveguide. By repeating this operation, almost all light is converted into P polarized light and caused to emits. Therefore, it is possible to achieve a polarized light emitting backlight device of which the light utilization efficiency is high.

The light converting means may be a lens array sheet or prism sheet array for making the diagonally emitted light be directed in the direction substantially normal to the waveguide or a hologram that converts the light path and has diffusibility.

The liquid crystal display using the above backlight device is so designed that the polarization axis of the backlight device is made coincident with that of the polarizer, on the incident side of the liquid crystal display element for displaying while controlling the polarized state of TN type and STN type. Thus, the light from the backlight device can be utilized with high efficiency, and bright light for displaying can be obtained under small power consumption.

The liquid crystal display using the above backlight device has a diffusible layer provided on either front side or rear side of the liquid crystal display element. Here, although the diffusible layer is preferably provided on the outside of the polarizing plate on the displaying side, it may be disposed on the inside of the polarizer, or on the backlight device side of the liquid crystal display element unless it changes the polarized state. In addition, the diffusible layer can control diffusibility, the viewing angle can be adjusted arbitrarily in accordance with the working conditions. Therefore, it is possible to provide a liquid crystal display capable of bright display at wide viewing angle under small power consumption.

(Embodiments 1)

An embodiment of a backlight device and a liquid crystal display with the backlight device, according to the invention will be described with reference to the accompanying drawings.

FIG. 1 is a cross-sectional diagram of one embodiment of the backlight device according to the invention. The backlight device shown in FIG. 1 is of the edge light plane type, and has a wedge-shaped waveguide 30, a cold fluorescent lamp 10 with an emission length corresponding to the side length of the wedge-shaped waveguide 30, and a reflector 11 for covering the lamp 10 and reflecting the light into the wedge-shaped waveguide side, the cold fluorescent lamp and reflector being provided on one side of the waveguide 30. The wedge-shaped waveguide 30 is made of an acrylic resin (of which the refractive index is 1.49) and has a white ink dot pattern formed on its rear side so that the dot area is increased with the increase of the distance from the cold fluorescent lamp and that its thickness is decreased with the increase of the distance from the one side of lamp.

Since the white ink dot pattern is printed to increase the dot area with the increase of the distance from the cold fluorescent lamp 10, the light from the wedge-shaped waveguide 30 can be made uniform over the surface.

In addition, under the rear side of this wedge-shaped waveguide 30, there are provided a reflecting plate 31 and a polarization eliminator 32.

Moreover, polarizing beam splitting means 40 formed of a dielectric multilayer film is provided on the wedge-shaped waveguide 30, and a prism array sheet as a light converting means 50 is provided on the polarizing beam splitting means. The vertex angle, 51, of each-prism of the prism array sheet is selected to be 65 degrees so that the light from the waveguide 30 is incident substantially perpendicular to a diffusible member 60 that is provided on the light converting means 50. The diffusible member 60 is made of a polymer film that is described in "A Novel Polymer Film that Controls Light Transmission" Progress in Pacific Polymer Science 3 Springer-Verlag Berlin Heidelberg, 1994, pp. 159 to 169.

The vertex angle of the prism array sheet is not limited to 65 degrees, and the vertex side may be provided on the front side or rear side, depending on the directionality and light path conversion angle.

Figure 7:
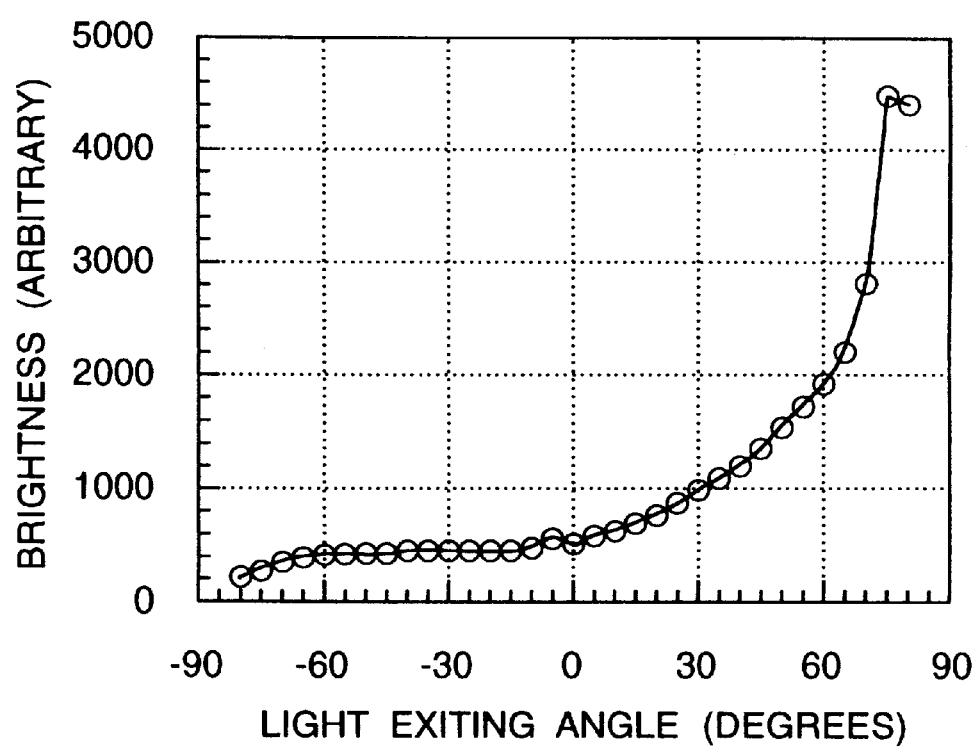
FIG. 7 is a graph showing the characteristic of the embodiments of the backlight device of the invention.
Figure 8A:
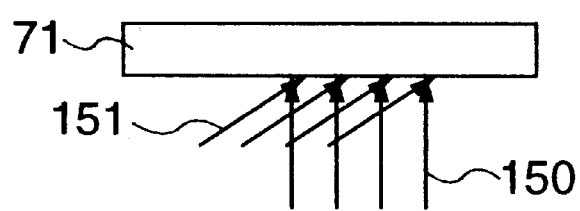
FIGS. 8A and 8B are schematic cross-sectional diagrams showing one example of the method for producing light converting means used in the backlight device of the invention.
Figure 8B:
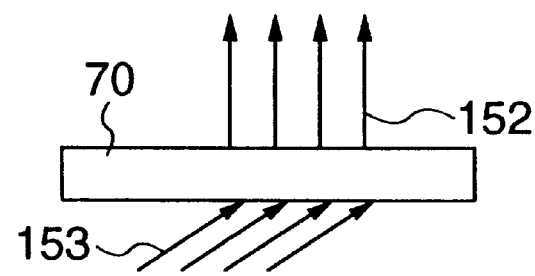

The distribution of the light emitted from the wedge-shaped waveguide 30 has the maximum at an angle of about 70 degrees to the normal to the light emitted surface of the waveguide 30 as shown in FIG. 7. The light from the waveguide is found considerably highly parallel since the half-amplitude level of the light is ±10 degrees or below. Thus, the characteristics of the polarizing beam splitting means 40 formed of a dielectric multilayer film having great angle dependence can be effectively utilized.

Figure 2:
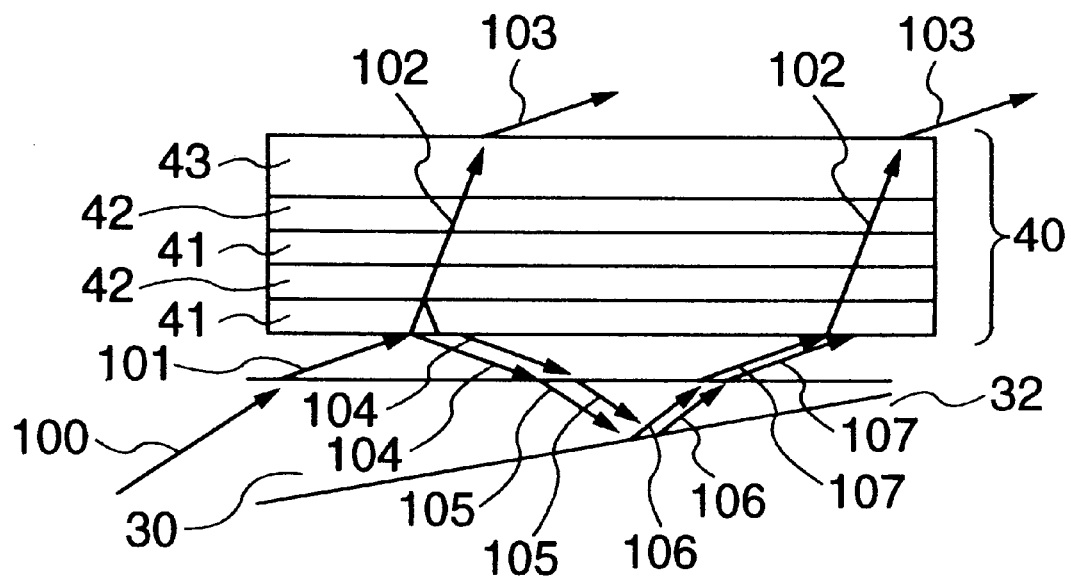
FIG. 2 is a schematic cross-sectional diagram showing the action of the backlight device of the invention.

When the polarizing beam splitting means 40 is disposed on the wedge-shaped waveguide 30, a light ray 100 conducted in the waveguide 30 as shown in FIG. 2 exits from the waveguide 30 and is passed through a light path 101, and only the P polarized light component is passed through the light paths 102 and 103.

The S polarized light component is reflected from the interface therebetween as a light path 104 and incident to the waveguide 30. The S polarized light component transmitted in the waveguide is converted into the P polarized light by the polarization eliminator 32 disposed under the rear side, and only the P polarized light component is transmitted through light paths 106 and 107, and the light is passed through the light paths 102 and 103.

The polarization eliminator 32 provided under the rear side of the waveguide 30 converts the S polarized light into the P polarized light. Even if it is converted into an elliptical polarized light, only the P polarized light component is transmitted through the polarizing beam splitting means 40, and the S polarized light component is reflected from the polarizing beam splitting means. By repeating this operation, all the light can be finally converted into the P polarized light and caused to exit from the polarizing beam splitting means.

Figure 10:
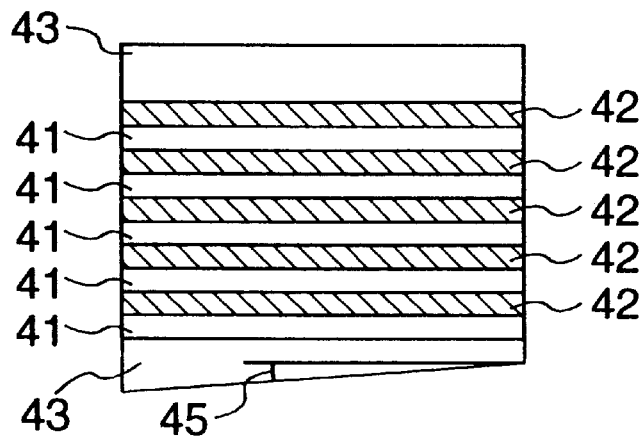
FIG. 10 is a schematic cross-sectional diagram of a polarizing beam splitter that is formed of a dielectric multilayer film according to the invention.

The polarized light splitting means 40 in this embodiment is made of a dielectric multilayer film shown in FIG. 10. As illustrated, the dielectric multilayer film has alternate transparent media 41, 42 laminated five times between support media 43 of polycarbonate (refractive index, 1.586). The transparent medium 41 is made of $ZrO_2$ (refractive index, 2.05), and the transparent medium 42 is made of $MgF_2$ (refractive index, 1.38).

The thickness of the transparent media 41, 42 is selected to be 138 nm, and the slope angle, 45, of the lower support medium 43 is fixed to about 8 degrees. The reason is that the light exiting from the wedge-shaped waveguide 30 is caused to exit at about 70 degrees, and that the light exiting at 70 degrees is caused to meet the Brewster's law at the interface between the layers. However, those settings are changed depending on the refractive indexes of the transparent media and support media.

Figure 11:
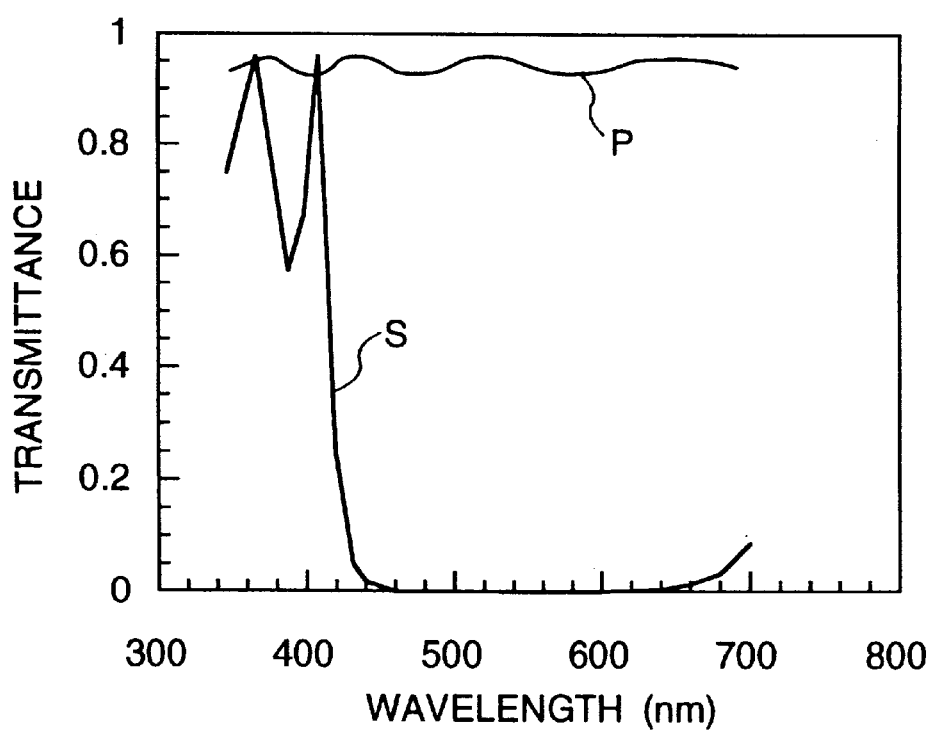
FIG. 11 is a graph showing the relation between the transmittance and wavelength of S and P polarized light.

FIG. 11 shows the transmittance of both S and P polarized light of the non-polarized light incident at 70 degrees to the polarizing beam splitting means depicted in FIG. 10. From FIG. 11, it will be seen that the polarizing beam splitting means exhibits a high transmittance for the P polarized light over almost all visible region (440 to 700 nm) and a low transmittance for the S polarized light over all the visible region. In other words, since all the S polarized light is reflected from the polarizing beam splitting means, the polarizing beam splitting means has an excellent separation characteristic.

When this polarizing beam splitting means was applied to the backlight device of FIG. 1, and mounted to be coincident with the polarizing axis of the TFT liquid crystal display element, this display exhibited a brightness characteristic about 1.5 times higher than the display using the conventional backlight device, under the same power consumption in the backlight.

Figure 3:
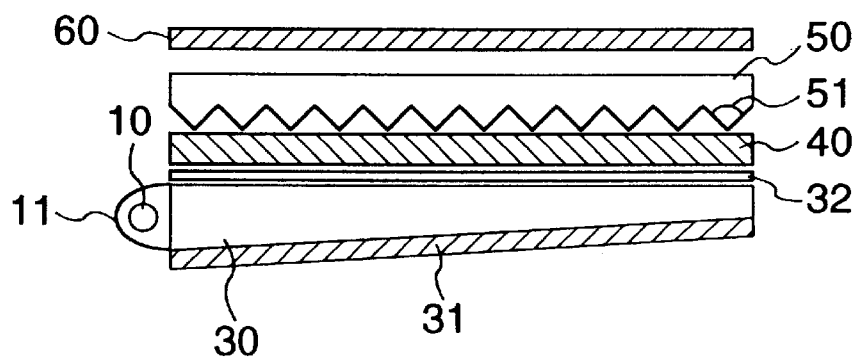
FIG. 3 is a schematic cross-sectional diagram of another embodiment of a backlight device of the invention.

A retardation film as the polarization eliminator 32 was disposed on the wedge-shaped waveguide 30 shown in FIG. 3, and the other elements were arranged as illustrated in FIG. 1. In this case, a high-polarization backlight device could be obtained similarly as in the above description. When this backlight device was mounted on the TFT type liquid crystal element to coincide with its polarization axis, the display brightness was about 1.5 times higher as above.

Figure 4:
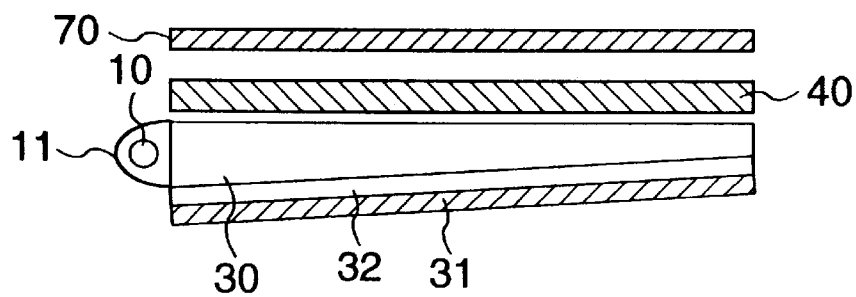
FIG. 4 is a schematic cross-sectional diagram of another embodiment of a backlight device of the invention.

In addition, as shown in FIG. 4, a hologram as light converting means (diffusible light converting means) 70 having diffusibility and directionality was disposed in place of the light converting means 50 and diffusible member 60 depicted in FIG. 1.

The above hologram is produced as in the schematic diagrams of FIGS. 8A, 8B, 9A and 9B. A laser was used as a good-interference light source, and parallel reference light 151 and parallel object light 150 were irradiated on a photopolymer 71 (DMP-128). In this case, a grating with the refractive index modulated is formed on the photopolymer 71 by the interference between the reference light 151 and the object light 150.

When incident light 153 is irradiated on the produced hologram, or light converting means 70 in the same direction as the reference light 151, it is diffracted by the hologram effect and as a result exiting light 152 is produced from the hologram. Thus high-efficiency light path conversion can be achieved.

Figure 9A:
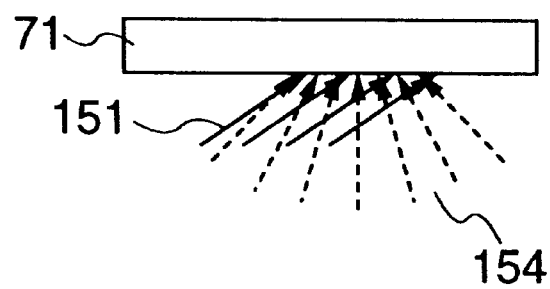
FIGS. 9A and 9B are schematic cross-sectional diagrams showing another example of the method for producing light converting means used in the backlight device of the invention.
Figure 9B:
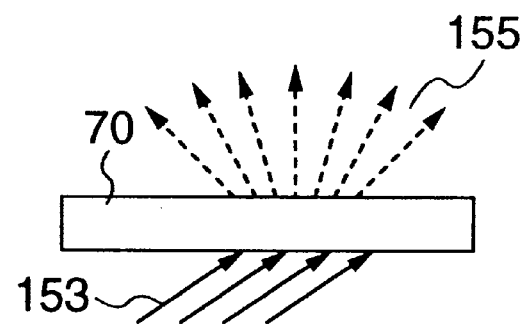

When diffusive light is desired to produce, focused object light 154 and reference light 151 are similarly irradiated on the photopolymer as shown in FIG. 9A so that the hologram can be obtained. When the incident light 153 is irradiated on this hologram, or light converting means 70 in the same direction as the reference light 151, diffused exiting light 155 can be obtained by the hologram effect as shown in FIG. 9B.

Thus, by controlling the diffused state of the object light, it is possible to produce a hologram having arbitrary diffusibility, and thereby to convert or diffuse the exiting light from the polarizing beam splitting means 40 in the direction of the normal to the exiting surface of the wedge-shaped waveguide.

Figure 5:
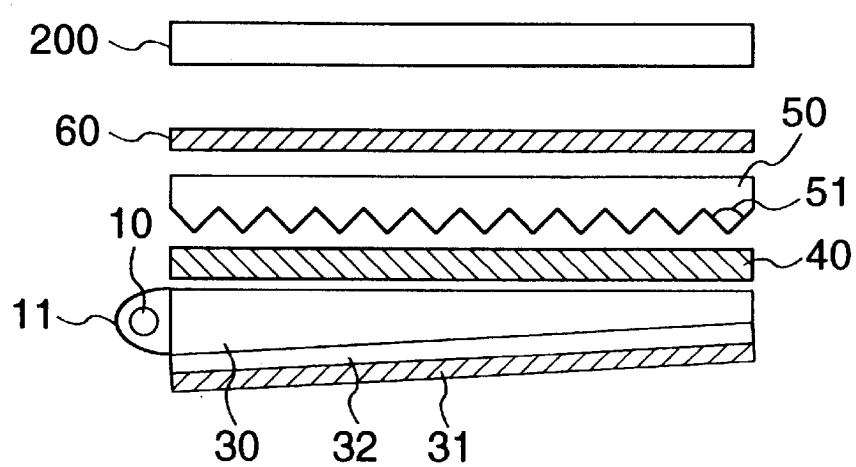
FIG. 5 is a schematic cross-sectional diagram of one embodiment of a liquid crystal display using the backlight device of the invention.

As shown in FIG. 5, a TFT type liquid crystal display element 200 with active elements that is made of TN liquid crystal for control of polarized light and for display was provided on the backlight device of FIG. 1. When the polarization axis of the polarizing plate of the liquid crystal display element 200 was made substantially coincident with the polarization direction of the backlight device, the display brightness was about 1.5 times higher than that of the display using the conventional backlight device, and a wide viewing angle characteristic could be obtained.

Figure 6:
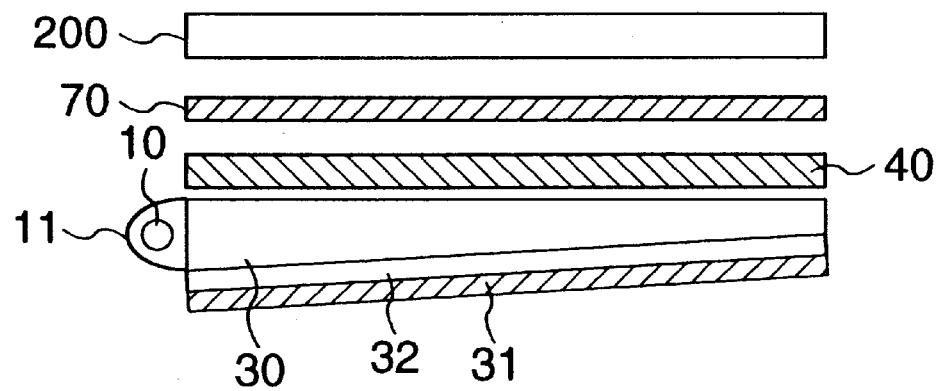
FIG. 6 is a schematic cross-sectional diagram of another embodiment of a liquid crystal display using the backlight device of the invention.

In addition, as shown in FIG. 6, the diffusive light converting means 70 was provided in place of the light converting means 50 and diffusive member 60 of the backlight device illustrated in FIG. 5. That is the TFT type liquid crystal display element 200 with active elements that is made of TN liquid crystal for control of polarized light and for display was disposed on the backlight device shown in FIG. 4. Also, the polarization axis of the polarizing plate of the liquid crystal display element was made substantially coincident with the polarization direction of the backlight device. The backlight device used in this case employed a high-directionality hologram shown in FIG. 8B as the light converting means 70, and a diffusible member was provided on the display surface side of the liquid crystal display element 200.

In this case, if the diffusible member does not disturb the polarization, it may be located on any side of the liquid crystal display element. However, since high transmittance and high contrast ratio are obtained by perpendicular transmission to the liquid crystal display surface, the diffusible member for a high-directionality backlight device should be disposed on the display surface side of the liquid crystal display element.

Thus, there are two arrangements: in one arrangement, the light exiting from the backlight device is converted by the light converting means so as to be substantially perpendicular to the display surface of the liquid crystal display element, and after passing through the liquid crystal display element it is diffused to achieve a wide viewing angle; and in the other arrangement, the incident light to the liquid crystal display element is diffused while keeping its polarized state, thereby to provide a wide viewing angle characteristic.

In the former arrangement, it is necessary to increase the degree of parallel of the exiting light from the backlight device in order for blur to be prevented from occurring between pixels. In the latter arrangement, it is effective to use a liquid crystal display element having a wide viewing angle characteristic.

As the wide viewing angle liquid crystal display element, there are multi-domain and random-domain TN type liquid crystal display elements, and lateral electric field TN type liquid crystal display element in which the state of orientation of the liquid crystal layer is controlled by applying a voltage in parallel to the display surface.

Also, as shown in FIGS. 1 and 3, the polarization eliminator 32 should be provided in order that the P polarized light is efficiently transmitted by the polarizing beam splitting means and that the reflected S polarized light is efficiently converted into the P polarized light. The polarization eliminator 32 is preferably one which provides a phase difference of ½ wavelength in going-back and-fourth transmission so that the S polarized light can be converted into the P polarized light. It is also effective if only the P polarized light produced by conversion is transmitted through the polarizing beam splitting means, with the S polarized light being repeatedly reflected so as to be finally converted into the P polarized light.

Although the retardation film as the polarization eliminator 32 is preferably made of rolled polycarbonate or the like, it may be an arbitrary one which has the same characteristics.

While in this embodiment the wedge-shaped waveguide is made of an acrylic resin, it may be made of a transparent medium of glass, polycarbonate, polyurethane, polystyrene, silicone or the like.

Moreover, while the polarizing beam splitting means is formed of a multilayer film of $ZrO_2$ and $MgF_2$ on the support members of polycarbonate, it may be made of materials of Ge, $Y_2O_3$, ZnO, Si, ZnS, $TiO_2$, $SiO_2$, $Ta_2O_5$ and the like.

(Embodiments 2)

In the wedge shaped backlight device of FIG. 1, TEFLON AF 1600 (refractive index, 1.31) film made by MITSUI/DUPON CHEMICAL is bonded between the light converting means 50 and the diffusible member 60 in order to reduce the reflection at the interface. Thus, this backlight device is capable of reducing reflection and increasing brightness.

Moreover, when the TEFLON AF 1600 (refractive index, 1.31) film was similarly bonded on the top of the light converting means 50 in FIG. 3, and on the top of the light converting means 70 in FIG. 4, the wedge-type backlight device of each case was able to reduce reflection and increase brightness by about 5%.

In the liquid crystal display shown in FIG. 5., when the TEFLON AF 1600 (refractive index 1.31) film was bonded between the liquid crystal display element 200 and the diffusible member 60 and between the diffusible member 60 and the light converting means 50, the brightness could be increased similarly as above. At this time, when a low refractive index medium is interposed between the light converting means 50 and the polarizing beam splitter 40, the angle of the exiting light from the polarizing beam splitter 40 was decreased, and thus the vertex angle 51 was further decreased so that the light from the light converting means 50 could be incident substantially perpendicular to the diffusible member 60.

In the liquid crystal display shown in FIG. 6, when the TEFLON AF 1600 film was disposed between the liquid crystal display element 200 and the light converting means 70 and between the light converting means 70 and the polarizing beam splitter 40, the brightness could be similarly increased. At this time, since the angle of the exiting light from the polarizing beam splitter 40 is changed (the angle of the exiting light is reduced if a low refractive index transparent medium was interposed), the light converting means 70 is necessary to be produced on condition that the TEFLON AF 1600 film is interposed.

By the arrangements of the embodiments 1 and 2, it is possible to achieve the backlight device of high polarization degree under low power consumption. Moreover, it is possible to provide a TFT type liquid crystal display of active drive that uses this backlight device and TN liquid crystal for control of polarization and for display, and a bright, low power consumption STN type liquid crystal display of simple matrix drive that uses TN liquid crystal and the backlight device.

There are other means for making light exit from the waveguide in the direction perpendicular to the light propagating direction. In other words, there are provided a backlight device having a light source, a waveguide disposed close to the light source, light converting means for making the light from the light source substantially parallel, and polarizing means that is included in the waveguide for guiding light from the light converting means and makes substantially linearly polarized light exit from the waveguide in the direction substantially perpendicular to the light conducting direction, and a liquid crystal display having a liquid crystal display element and the backlight device that is disposed on the back side of the liquid crystal display element so that the average polarization axis of the light exiting from the backlight device is made substantially coincident with that of the polarizer, on the light incidence side, of the liquid crystal display element.

The light converting means is disposed between the light source, or lamp and the waveguide in order to make the diffused light from the light source highly parallel. For this means, a reflecting plate (preferably a paraboloidal mirror) is provided around the light source, and its thickness is increased with the increase of the distance from the lamp. In this case, the degree of parallel of light can be increased by utilizing total reflection and reducing diffusion of light. Another arrangement is also possible for absorbing light propagated at a certain angle or above, and for allowing only highly parallel light to be selectively propagated though a film of a constant thickness as proposed in JP-A-6-202107 Gazette is constant.

The polarizing means is made of transparent media of which the indexes are different from the waveguide itself and which are laminated with a slope relative to the light incidence direction. Preferably, the polarization eliminators are attached to the laminated transparent media. The refractive indexes and the slope angle of the transparent media are determined to meet the so-called Brewster's law in which only the S polarized light (the polarized light perpendicular to the incident plane, which is the plane including the incident light and the normal to the incident light at the boundary plane) of the incident light to the waveguide is reflected therefrom. Thus, part of the S polarized light is reflected back to the liquid crystal display element side, and the remaining S polarized light and the P polarized light (polarized light parallel to the incident plane) are transmitted therethrough and eliminated in their polarization by the polarization eliminator. When they are incident to the next transparent medium layer, only the S polarized light is reflected back to the liquid crystal element side by the same phenomenon, and the remaining light is transmitted. These operations are repeated. Thus, the backlight device is able to irradiate linearly polarized light. It is generally known that when light is incident from a transparent medium of index $N_0$ to another transparent medium of index $N_1$ at an incident angle of $\theta$, all the reflected light is the S polarized light with no P polarized light reflected and with the remaining S polarized light and P polarized light being transmitted under the condition that the tangent of incident angle $\theta$ is $N_1/N_0$ (tan $\theta = N_1/N_0$). The incident angle $\theta$ is the Brewster angle.

Part of only the S polarized light at around Brewster angle is reflected from the interface between the media, and the remaining S polarized light and the P polarized light are transmitted therethrough. The polarization eliminator eliminates the polarization. Then, only the S polarized light is again reflected from the interface between other transparent media of different refractive indexes. These operations are repeated in the light propagating direction, and finally only the S polarized-light exits toward the liquid crystal display element side.

In addition, when the transparent media and the polarization eliminators are laminated at the same slope angle and with equal spacings, the brightness is reduced with the increase of the distance from the light source since the reflectance of the transparent media to which the S polarized light is incident is constant. Thus, The spacing between the laminated transparent medium and polarization eliminator is decreased with the increase of the distance from the light source. Alternatively, the refractive index and slope angle of the transparent media is increased with the increase of the distance from the light source so that the reflectance is increased by the reduction of light quantity. Thus, the uniformity of light over the surface can be improved.

Also, the liquid crystal display using the backlight device is constructed so that the polarization axis of the backlight device is made coincident with that of the polarizing plate on the light incidence side of the liquid crystal display element for controlling the polarized state such as TN type and STN type and for displaying. Thus, the liquid crystal display can efficiently utilize the light from the backlight device, and thus display brightly under low power consumption.

The liquid crystal display using the backlight device has a diffusive layer provided on either side, or front side or rear side, of the liquid crystal display element. This diffusive layer is preferably disposed on the outside of the polarizer that is provided on the display side. However, if the polarized state is not changed, it may be provided on the inside of the polarizer plate, or on the backlight device side of the liquid crystal display element. Moreover, if the diffusive layer is able to control the diffusibility, the viewing angle can be arbitrarily adjusted under the working conditions. Thus, the liquid crystal display can display brightly at a wide viewing angle under low power consumption.

Other embodiments of the backlight device and the liquid crystal display using the backlight device will be described in detail with reference to the accompanying drawings.

(Embodiments 3)

Figure 12:
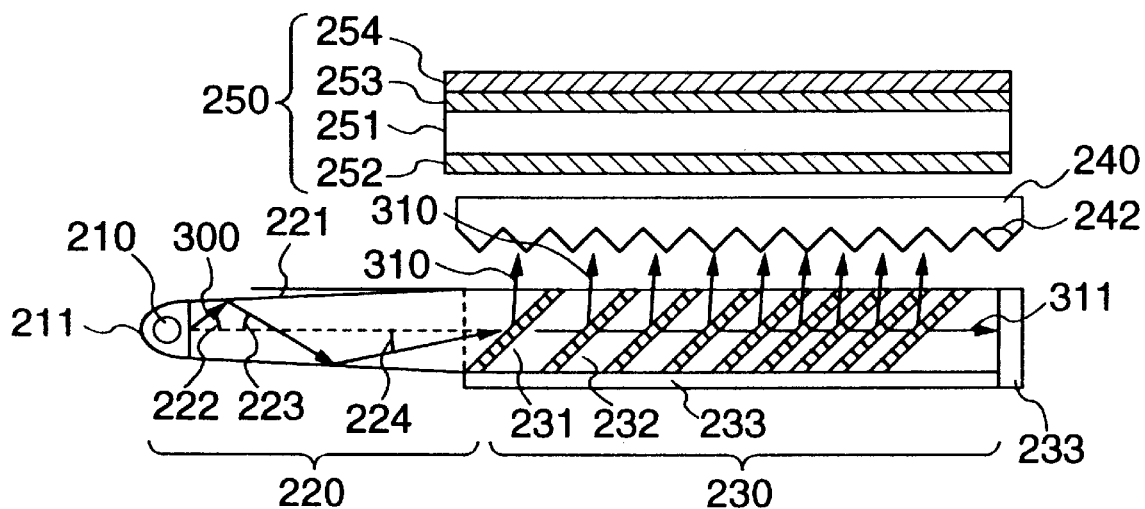
FIG. 12 is a partial cross-sectional diagram of other embodiments of the backlight device and the liquid crystal display using the backlight device, according to the invention.

FIG. 12 is a partial cross-sectional diagram of an embodiment of the backlight device and liquid crystal display using the backlight device. This embodiment is an edge light type plane backlight device. This backlight device is formed of waveguide/polarizing means 230 which is made of transparent acrylic resin (refractive index, 1.49) and high-refractive-index transparent media (ZnO: refractive index, 2.01) for backlight surface and which has light guiding action and polarizing action, a cold fluorescent lamp 210 having a light emission length corresponding to the side length of the waveguide/polarizing means 230, a reflecting plate 211 for covering the lamp and reflecting the light therefrom toward the waveguide/polarizing means 230, and light converting means 220 for converting the light into substantially parallel light in the propagation direction, this light converting means 220 connecting the reflecting plate 211 and the waveguide/polarizing means 230. The light exiting from the cold fluorescent lamp 210 is reflected from the reflecting plate 211 preferably having a paraboloidal surface and efficiently incident to the light converting means 220. The light, 300, incident to the light converting means 220 is efficiently made parallel and incident to the waveguide/polarizing means 230 at an angle 224 within ±10 degrees. The transparent media, 231 are tilted so that the light incident to the waveguide/polarizing means 230 at an angle 224 ±about zero degree is incident to the transparent media 231 of refractive index, 2.01 at an angle of about 53.4 degrees. Part of the S polarized light is reflected from the surface of the transparent medium 231, and the reflected light, 310, or only the S polarized light component, exits from the waveguide/polarizing means 230 in the direction of about 26 degrees to the normal to the display surface of the waveguide/polarizing means 230. The remaining S polarized light and P polarized light are transmitted therethrough and incident to the next transparent medium 231 where part of only the S polarized light is again reflected. Here, since the quantity of the (propagating) light 311 is gradually decreased, the waveguide/polarizing means 230 is so constructed that, to compensate for the light attenuation, the transparent media 231 and the waveguide portions 232 are alternately laminated in a slant way with the spacings between the media being gradually decreased in the light propagation direction. Therefore, the light 310 exiting from the waveguide/polarizing means 230 has substantially uniform intensity in the light propagation direction. The waveguide/polarizing means 230 also has a reflecting plate 233 provided on the bottom and end side. In addition, ten or more layers of the transparent media 231 are laminated in order to attenuate the propagated light 311 to almost zero at the end side. The light 310 exiting from the backlight device, or only the S polarized light component, leaves at 26 degrees from the backlight device. Thus, a prism sheet array with a vertex angel 242 of 51 degrees, as second light converting means 240, is provided on the light emerging side of the waveguide/polarizing means 230 in order to make the sxiting light incident substantially perpendicularly to a liquid crystal display element 250. Here, the slope angle of the transparent media 231 and the angle at which the light 310 emerges from the waveguide/polarizing means 230 are determined by the refractive indexes of the waveguide portions 232 and transparent media 231. Therefore, the vertex angle of the second light converting means 240 is necessary to be coincident with the angle of the exiting light 310.

The liquid crystal display element 250, or TFT type LCD, provided on the backlight device is made of TN liquid crystal 251 for control of polarization and for display and has active elements. The polarizing direction of the polarizer, 252, of the liquid crystal display element 250 is substantially made coincident with that of the exiting light 310. In addition, since the directionality of the backlight device in this embodiment is sharp, a diffusible member is provided on the display side of the liquid crystal display element 250. Thus, the brightness is increased about 1.5 times as high as that of the conventional backlight device, and the viewing angle characteristic is also improved.

The light 310 exiting from the backlight device emerges with a spread of about 5 degrees to about 60 degrees from the backlight device because the incident light to the waveguide/polarizing means 230 has a spread of ±10 degrees. Thus, even if the prism sheet array as the second light converting means 240 and the diffusible member 260 are removed, the liquid crystal display element 250 still has a sufficiently wide viewing angle characteristic. However, since the exiting light is polarized, the diffusible member made of a hologram or the like by which the polarization is not disturbed may be preferably used as the second light converting means 240. The hologram can be easily produced by laser interference. For example, a photopolymer of DMP-128 can be used to arbitrarily provide diffusibility and directionality under interference conditions. As described above, two arrangements can be used: the light 310 exiting from the backlight device is changed by the second light converting means to be substantially perpendicular to the display surface of the liquid crystal display element, and diffused after passing through the liquid crystal display element thereby to widen the viewing angle; and before being incident to the liquid crystal display element, the light is diffused while keeping the polarization, thereby widening the viewing angle. In the former arrangement, it is necessary to make the exiting light from the backlight device highly parallel so that blur between pixels can be prevented. In the latter arrangement, it is advantageous to use a liquid crystal display element having an excellent viewing angle characteristic in itself. The wide viewing angle liquid crystal display element is a multidomain or random domain TN type liquid crystal or a lateral electric field type liquid crystal display element in which the state of orientation of the liquid crystal layer is controlled by applying a voltage parallel to the display surface.

Figure 13:
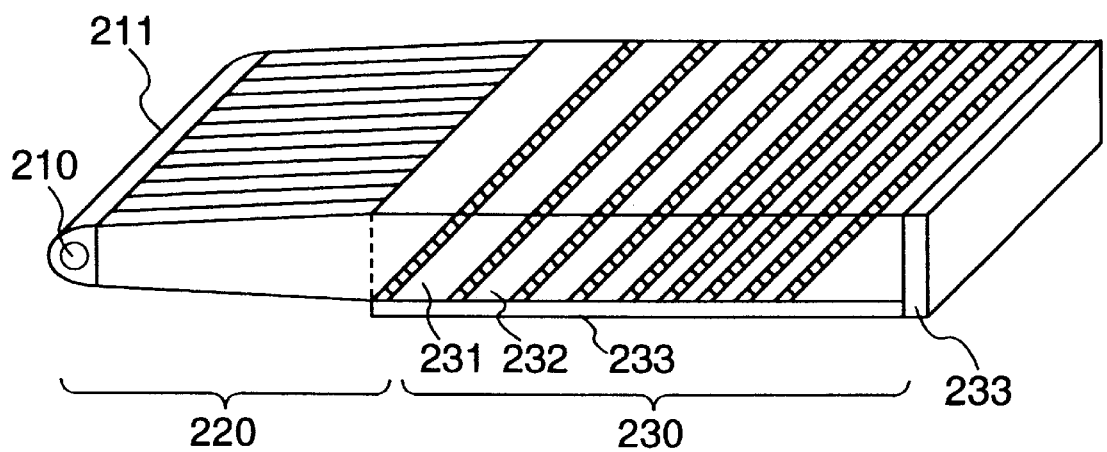
FIG. 13 is a perspective view of another embodiment of a backlight device of the invention.
Figure 20:
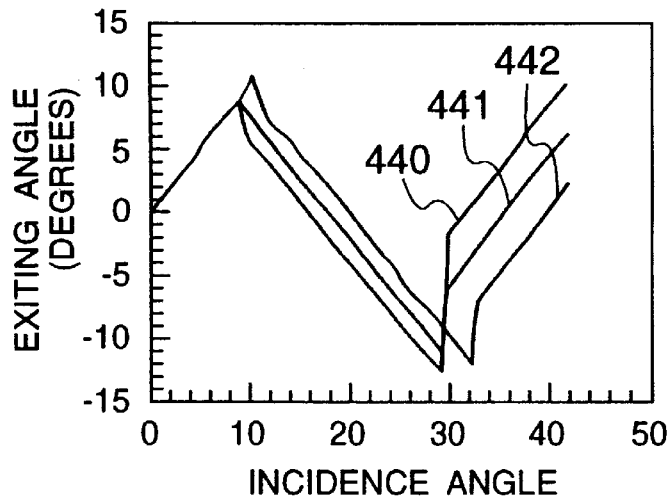
FIG. 20 is a graph showing the characteristic of the embodiments of the backlight device of the invention.

The incidence angle, 300, of the light from the lamp 210 to the light converting means 220 toward the light conducting direction is 42 degrees, maximum since the light converting means 220 is made of acrylic resin (refractive index, 1.49) in this embodiment. This incidence angle can be determined by the refractive index $N_p$ (air 1.0 in this embodiment) on the lamp side and the refractive index $N_o$ of the light converting means 220. The maximum incidence angle $\theta$ to the light converting means 220 satisfies the equation, $\sin(\theta)=N_p/N_o$ by Snell's law. Here, the light converting means 220 is tilted by a constant angle 221, or 9 degrees in this embodiment. The light incident at an incidence angle to this light converting means 220 is totally reflected from the surface of the light converting means 220, and incident at incidence angle 224 to the waveguide/polarizing means 230, or parallel light within ±10 degrees is incident to the waveguide/polarizing means 230. Thus, the light incident thereto can be parallel ±10 degrees up or down as seen in FIG. 12. In order that the incident light can also be made parallel for the direction toward reader, or out of or into the drawing, or for depth direction, a number of sliced light converting elements 220 are cemented as illustrated in FIG. 13 thereby to make the incident light parallel for the depth direction. At this time, the light converting element 220 is 3 mm thick on the lamp side, 30 mm on the conductor/polarizing means 230, and 85 mm long. In addition, when the tilt angle 221 of the light converting means 220 is 8, 9 and 10 degrees, the incident light 224 to the waveguide/polarizing means 230 can be shown by curves 440, 441 and 442, respectively as shown in FIG. 20. From FIG. 20, the incident light can be efficiently made parallel. In this case, the light converting means 220 and the waveguide portions 232 of the waveguide/poiarizing means 230 are made of acrylic resin. The arrangement is necessary to be optimized by the refractive indexes of the media.

Figure 17:
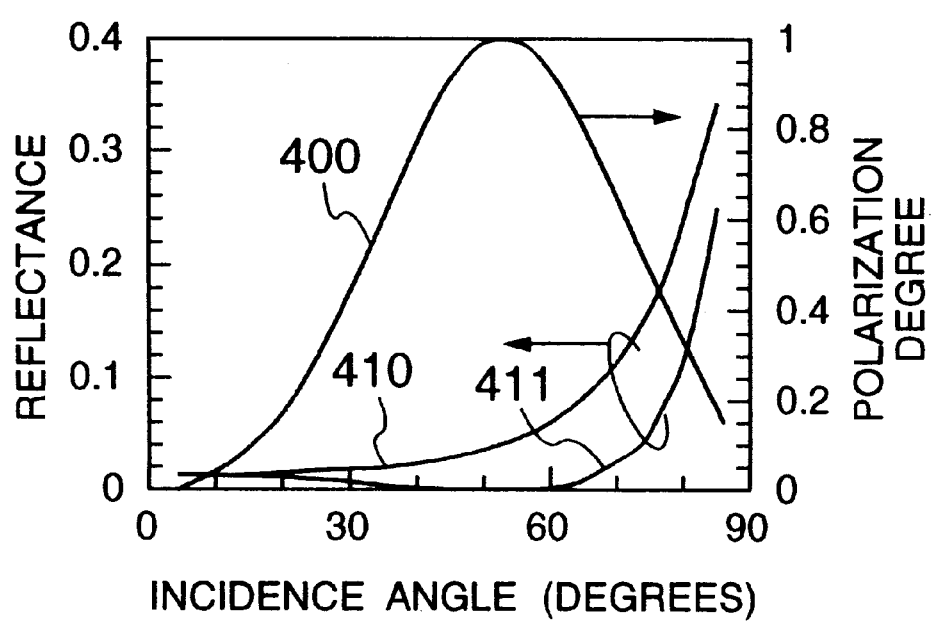
FIG. 17 is a graph showing the characteristic of the embodiments of the backlight device of the invention.

FIG. 17 is a graph of the dependence of polarization degree and reflectance on the incidence angle in one layer of the waveguide/polarizing means 230 according to this embodiment. Here, the reflectance is for perfect non-polarized light, and the refractive indexes of the waveguide portions 232 and transparent media 231 are respectively 1.49 and 2.01. The reflectance values for the S polarized light and P polarized light are represented by curves 410 and 411, respectively. The polarization degree, which is given by dividing the difference between the S, P polarized light by the sum of the S, P polarized light, is indicated by curve 400. Part of only S polarized light of the incident light substantially in parallel to the light exiting surface of the waveguide/polarizing means 230 is reflected 100% by the waveguide/polarizing means 230. Even if the incident light has a spread of ±10 degrees, a polarization degree of 80% or above can be obtained. Therefore, as in the previously given embodiments, the light incident at ±10 degrees to the waveguide/polarizing means 230 can be efficiently converted into linearly polarized light.

Figure 18:
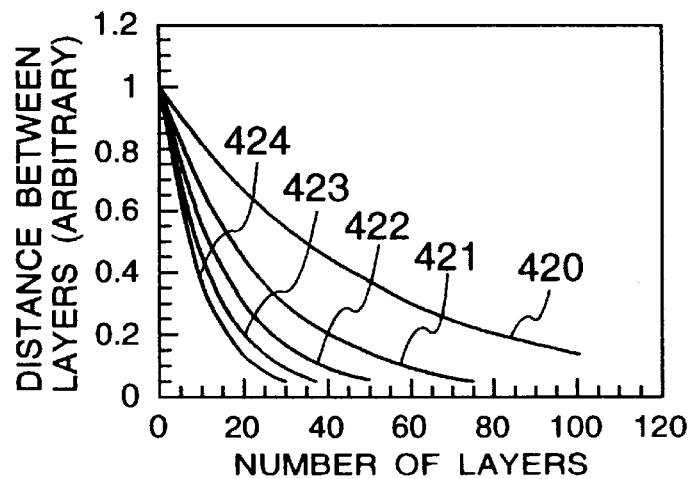
FIG. 18 is a graph showing the characteristic of the embodiments of the backlight device of the invention.

In the arrangement shown in FIG. 12, it is necessary that the spacings between the transparent media 231 acting as polarizing means be decreased by a value corresponding to the reduction of the quantity of-exiting light 310 in order to make the exiting light 310 from the backlight device uniform. FIG. 18 shows the distance between the layers for the reflectance values of 2, 4, 6, and 8% of each layer to non-polarized light incident at Brewster angle. It is necessary that the spacings between the layers be reduced with the increase of the distance from the lamp 210, or preferably, determined by the results shown in FIG. 18. With this arrangement, the uniformity of light over the surface can be remarkably improved. This uniformity can be obtained when the thickness of the transparent media 231 is thick enough. When the thickness of the transparent media 231 is thin enough to cause reflected components to interfere with each other in the interfaces on the incidence side and light-exiting side of the transparent media 231 the spacings between the layers are different from those in FIG. 18. In other words, the reflectance shown in FIG. 18 is the reflectance of only the surface for S polarized light. If the thickness of the media layers has such an effect that the phases of light in both interfaces strengthen each other, the reflectance is increased about twice. Therefore, if the going-back-and-forth light path in the transparent media 231 is 2m or (2n+1) times the wavelength/4, the phases in both interfaces strengthen each other or weaken each other (m, n is an arbitrary integer). Roughly speaking, strengthening each other will double the reflectance, but weakening each other will reduce the reflectance to zero. Therefore, by controlling the thickness of the transparent media 231, it is possible to change the reflectance and thereby to make the exiting light uniform over the surface.

Figure 14:
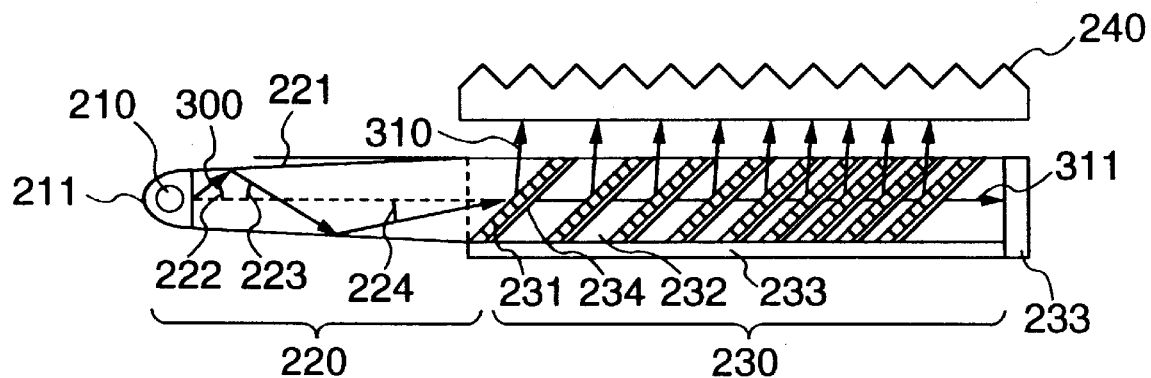
FIG. 14 is a partial cross-sectional diagram of another embodiment of a backlight device of the invention.

In addition, the S polarized light can be efficiently reflected if the polarization eliminator 234 for efficiently converting the P polarized light into the S polarized light as shown in FIG. 14 is provided after each of the transparent media 231 of the waveguide/polarization means 230 that is, as shown in FIG. 12, formed of the conductor portions 232 and the transparent media 231. Here, as the polarization eliminator 234, there is provided a retardation film capable of giving a phase difference of wavelength/4, where the wavelength is 550 nm, so that the conducted light 311, or the P polarized light can be converted into circularly polarized light. This polarization eliminator 234 may be a retardation film made of rolled polycarbonate (PC) or the like, and the material is arbitrary. Although the retardation film used has wavelength/4, it is not limited to wavelength/4, because part of even elliptically polarized light can be taken out as S polarized light.

Figure 15:
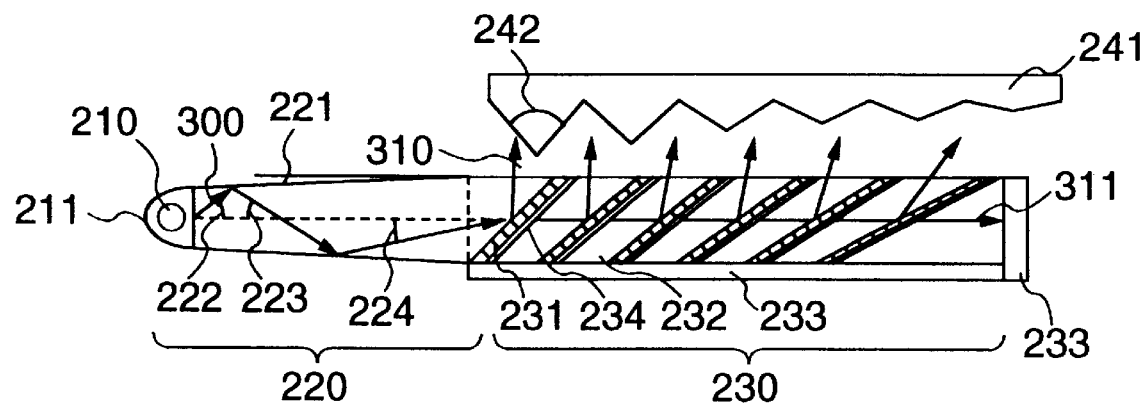
FIG. 15 is a partial cross-sectional diagram of another embodiment of a backlight device of the invention.
Figure 19:
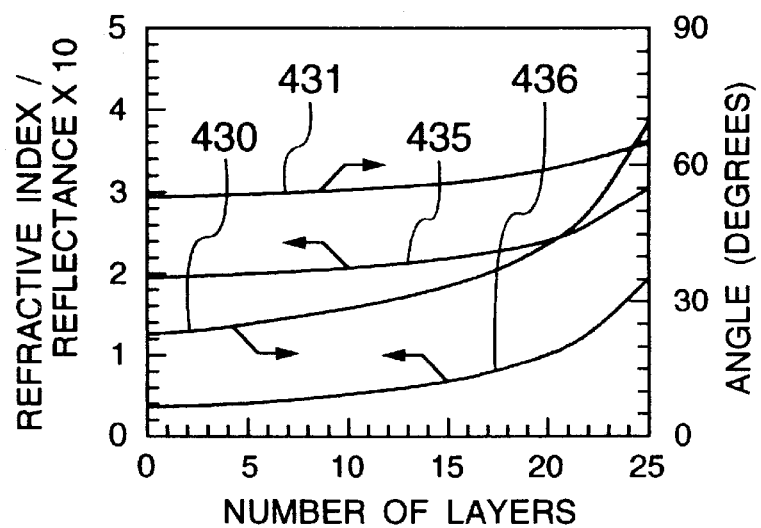
FIG. 19 is a graph showing the characteristic of the embodiments of the backlight device of the invention.

FIG. 15 illustrates another embodiment of the invention. The transparent media 231 of high refractive index and the polarization eliminators 234 are respectively laminated with equal spacings, and the transparent media 231 are gradually increased in their refractive index and tilted to have Brewster's angle with the decrease of the conducted light 311. FIG. 19 shows the relations of the number of laminated layers with light exiting angle 430, incidence angle 431, refractive index 436 and reflectance 436. The waveguide portions 232 are made of acrylic resin of refractive index 1.49. In this case, as illustrated in FIG. 19, the uniformity of light over the surface can be improved by changing the refractive index according to the number of layers and tilting the laminated transparent media 231 so that the incidence angle meets the curve 430. At this time, preferably the polarization eliminators 234 are also laminated, and since the exiting light 310 is given by the curve 430 in FIG. 19, a light converting element 241 is provided of which the vertex angle 242 is decreased with the increase of the distance from the lamp as shown in FIG. 15. Thus, the light exiting from the light converting element 241 is incident substantially perpendicularly to the liquid crystal display element, otherwise the light would exit at about 26 degrees near the lamp and at about 67 degrees after the laminated media of about 25 layers. Therefore, wide viewing angle and bright display can be achieved by disposing a diffusible member for diffusing light while keeping it polarized, on the incidence side or light-exiting side of the liquid crystal display element.

Figure 16:
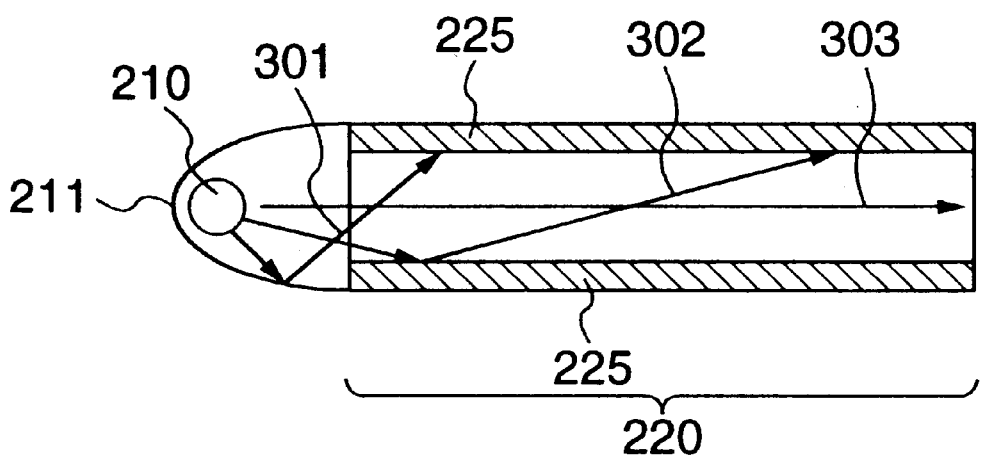
FIG. 16 is a partial cross-sectional diagram of another embodiment of a backlight device of the invention.

The light converting means 220 may be designed to have a constant thickness as proposed in Japanese Patent Application JP-A-6-202107, to absorb light propagated at a certain angle or above and thereby to selectively propagate only highly-parallel light as shown in FIG. 16. At this time, the light 301 incident at a certain angle or above is absorbed by an optical thin film 225, and light 302, 303 incident at an angle lower than the certain angle are totally reflected therefrom and thus conducted in the light converting means 220. Accordingly, since highly parallel light is incident to the waveguide/polarization means 230, the backlight device can provide highly polarized, bright light to the liquid crystal display element.

If the diffusible member 254 in FIG. 12 is designed so that the diffused state can be controlled by applying a voltage as in PDLC (polymer dispersion type liquid crystal), it is possible to achieve a liquid crystal display capable of adjusting the viewing angle in accordance with the working conditions. Moreover, hologram can be used for the diffusible member and light converting element as described above. According to the hologram, diffusibility and directionality can be freely determined.

While in the above embodiments the waveguide is made of acrylic resin, it may be made of a transparent medium such as glass, polycarbonate, polyurethane, polystyrene, or silicone. In addition, the transparent media for making Brewster's angle and reflecting only the S polarized light are made of not only glass, plastic, but also $MgF_2$, $ZrO_2$, Ge, $Y_2O_3$, ZnO, Si, ZnS, $TiO_2$, $SiO_2$, $Ta_2O_5$ or other materials.

The backlight device constructed as above can provide highly polarized, bright light to the liquid crystal display element under low power consumption. Furthermore, if this backlight device is used with active-drive TFT-LCD using TN liquid crystal for control of polarization and for display or with simple matrix drive STN-LCD using TN liquid crystal, it is possible to produce a bright, low power consumption liquid crystal display.

What is claimed is:

1. A backlight device comprising:
   a light source;
   a waveguide provided close to said light source, said waveguide being a wedge-shaped waveguide of which the thickness is decreased with the increase of the distance from the light source;
   polarizing beam splitting means provided on the light-exiting side of said wedge-shaped waveguide; and
   light converting means provided on said polarizing beam splitting means, said light converting means including a prism array sheet facing and directed toward said polarizing beam splitting means.

2. A backlight device according to claim 1, wherein the directionality of light exiting from said wedge-shaped waveguide is sharp.

3. A backlight device according to claim 1, wherein said light converting means provided on said polarizing beam splitting means causes maximum-intensity light to exit in the direction substantially perpendicular to the light-exiting plane of said wedge shaped waveguide.

4. A backlight device according to claim 1, wherein said light converting means converts light into diffusible light of maximum intensity and causes said converted light to exit.

5. A backlight device according to claim 1, wherein a light diffuser capable of diffusing light is further provided on said light converting means.

6. A backlight device according to claim 1, wherein said polarizing beam splitting means is formed of a multilayer film of flat layers having different refractive indexes.

7. A backlight device according to claim 1, wherein said polarizing beam splitting means provided on the light exiting side of said wedge-shaped waveguide or said light converting means provided on the polarizing beam splitting means has provided therein transparent media with their indexes lower than those of said polarizing beam splitting means or said light converting means.

8. A backlight device according to claim 1, wherein said wedge-shaped waveguide outputs light having a half-amplitude level which is no greater than ±10°.

9. A liquid crystal display having a liquid crystal display element having a pair of polarizing plates and for displaying images by controlling polarized state of light, and a backlight device disposed on the back of said liquid crystal display element, said backlight device comprising:
   a light source;
   a waveguide provided close to said light source, said waveguide being a wedge-shaped waveguide of which the thickness is decreased with the increase of the distance from said light source;
   polarizing beam splitting means provided on the light-exiting side of said wedge-shaped waveguide; and
   light converting means provided on said polarizing beam splitting means, said light converting means including a prism array sheet facing and directed toward said polarizing beam splitting means.

10. A liquid crystal display according to claim 9, wherein said light converting means of said backlight device converts light into diffusible light of maximum intensity and causes said converted light to exit.

11. A liquid crystal display according to claim 9, wherein said polarizing beam splitting means of said backlight device is formed of a multilayer film of flat layers having different refractive indexes.

12. A liquid crystal display according to claim 9, wherein a light diffusing layer is provided on the surface side of said liquid crystal display element.

13. A liquid crystal display according to claim 9, wherein a light diffusing layer capable of diffusing light is provided between said pair of polarizing plates of said liquid crystal display element.

14. A liquid crystal display according to claim 9, wherein said polarizing beam splitting means provided on the light exiting side of said wedge-shaped waveguide or said light converting means provided on the polarizing beam splitting means has provided therein transparent media with their indexes lower than-those of said polarizing beam splitting means or said light converting means.

15. A liquid crystal display according to claim 9, wherein the average polarization axis of light exiting from said backlight device is made substantially coincident with that of the light-incident side polarizing plate of said liquid crystal display element.

16. A liquid crystal display according to claim 9, wherein said wedge-shaped waveguide outputs light having a half-amplitude level which is no greater than ±10°.

17. A backlight device comprising:
   a light source;
   a waveguide provided close to said light source, said waveguide being a wedge-shaped waveguide of which the thickness is decreased with the increase of the distance from the light source;
   polarizing beam splitting means provided on the light-exiting side of said wedge-shaped waveguide; and
   light converting means provided on said polarizing beam splitting means;
   wherein said light converting means is a hologram having diffusibility and directionality.

18. A backlight device according to claim 17, wherein said wedge-shaped waveguide outputs light having a half-amplitude level which is no greater than ±10°.

19. A backlight device comprising:
   a light source;
   a wedge-shaped waveguide provided close to said light source and the thickness of which is decreased with the increase of the distance from said light source;
   a polarizing beam splitter formed of a multilayer film of dielectric layers of which the refractive indexes are different from each other, and disposed on the light exiting side of said waveguide so as to separate P polarized light and S polarized light; and
   a light converter provided on said polarizing beam splitter so as to convert diagonally running light into normal-direction light, said light converter including a prism array sheet facing and directed toward said polarizing beam splitter.

20. A backlight device according to claim 19, wherein said wedge-shaped waveguide outputs light having a half-amplitude level which is no greater than ±10°.

* * * * *